(12) United States Patent
Furukawa et al.

(10) Patent No.: US 7,403,016 B2
(45) Date of Patent: Jul. 22, 2008

(54) CAR POWER SOURCE APPARATUS

(75) Inventors: Kimihiko Furukawa, Kakogawa (JP);
Masahiko Hashimoto, Kasai (JP)

(73) Assignee: Sanyo Electric Co., Ltd., Osaka (JP)

( * ) Notice: Subject to any disclaimer, the term of this patent is extended or adjusted under 35 U.S.C. 154(b) by 80 days.

(21) Appl. No.: 11/159,135

(22) Filed: Jun. 23, 2005

(65) Prior Publication Data
US 2005/0285566 A1    Dec. 29, 2005

(30) Foreign Application Priority Data
Jun. 25, 2004    (JP)    ............................. 2004-187843

(51) Int. Cl.
*H02J 7/00*    (2006.01)
*G01N 27/416*    (2006.01)
*G01R 13/00*    (2006.01)

(52) U.S. Cl. .................. 324/426; 320/116; 320/119; 320/125; 320/134; 320/136; 324/434; 324/429; 324/430; 702/73

(58) Field of Classification Search .............. 320/116, 320/119, 124, 125, 134, 136; 324/426, 429, 324/430, 434; 702/73
See application file for complete search history.

(56) References Cited

U.S. PATENT DOCUMENTS 5,917,304 A * 6/1999 Bird ........................ 320/101
6,104,164 A * 8/2000 Iino et al. .................... 320/116
6,134,321 A * 10/2000 Pitsch .................... 379/399.01

FOREIGN PATENT DOCUMENTS

JP    2002-199510    7/2002

OTHER PUBLICATIONS

Datasheet for TLC3548, Texas Instruments, May 2003, p. 1-34.*

* cited by examiner

*Primary Examiner*—Matthew V Nguyen
*Assistant Examiner*—Jue Zhang
(74) *Attorney, Agent, or Firm*—Wenderoth, Lind & Ponack, L.L.P.

(57) ABSTRACT

A car power source apparatus is provided with a battery having a plurality of battery modules connected in series on positive and negative sides of a midpoint reference node, and a voltage detection circuit that detects the voltage of one or a plurality of battery modules with respect to the midpoint reference node of the battery. The battery midpoint reference node of the power source apparatus is connected to the voltage detection circuit via a plurality of reference connection lines. Further, one or a plurality of conduction detection circuits connect to the reference connection lines, supply a voltage to each reference connection line, and detect current. The connection status of each reference connection line to the midpoint reference node is determined by this conduction detection circuit.

11 Claims, 4 Drawing Sheets

CAR POWER SOURCE APPARATUS

BACKGROUND OF THE INVENTION

This invention relates to a power source apparatus for powering the driving motor of an electric vehicle, such as a hybrid car or electric automobile, and in particular, relates to a car power source apparatus which can accurately determine detection circuit malfunction with a simple circuit configuration.

To increase power source apparatus output to drive an electric vehicle, it is necessary to increase battery voltage. This is because power output is proportional to the product of battery voltage and current. For example, power source apparatus batteries for hybrid cars and electric automobiles are extremely high voltage at 200V or more. In a high voltage battery, a plurality of rechargeable batteries are connected in series to form battery modules, and those battery modules are again connected in series to increase output voltage.

In this type of battery comprising a large number of battery modules connected in series, it is important to charge and discharge each battery module while preventing over-charge and over-discharge. This is because over-charge and over-discharge degrade a battery's electrical performance and shorten its lifetime. A car power source apparatus has been developed to prevent battery module over-charge and over-discharge by detecting battery module voltage and controlling battery charge and discharge (refer to Japanese Patent Application Disclosure 2002-199510).

SUMMARY OF THE INVENTION

The power source apparatus disclosed in this reference detects the voltage of each battery module via a difference amplifier. In this power source apparatus, the voltage between the input terminal pair of each difference amplifier is roughly constant, but the voltage between input terminals and ground increases with each battery module. This is because the voltage with respect to ground of each series connected battery module gradually increases as the number of battery modules increases, and each difference amplifier detects that voltage as common-mode voltage. As a result, circuit design of the difference amplifiers becomes complex, or it becomes necessary to use high power supply voltage difference amplifiers.

As shown in FIG. 1, this drawback can be eliminated with a voltage detection circuit 23 which detects the voltage of each connection node 29 with respect to a midpoint reference node 28 at an intermediate connected battery module 22. The voltage detection circuit 23 of this figure detects battery module voltage from the difference between voltages at battery module connection nodes 29. Since this voltage detection circuit 23 detects voltages of battery module connection nodes 29 with respect to the midpoint reference node 28, all detected voltages are referenced with respect to the midpoint reference. Consequently, as shown in the figure, battery module connection nodes 29 are switched via a multiplexer 24 to allow detection of connection node voltages.

However, this voltage detection circuit 23 detects all voltages as voltage with respect to the midpoint reference node 28. Therefore, if the midpoint reference voltage becomes corrupted, no battery module voltage can be accurately detected. The midpoint reference node 28 is connected to the input side of the voltage detection circuit 23 via a reference connection line 29. The reference connection line 29 connects the midpoint reference node 28 to the voltage detection circuit 23 via conductors such as a connecting cord and connectors, or a connecting cord and terminals. Connectors and terminals electrically connect by mutually applied pressure on opposing metal surfaces. Change in metal surface properties over time cannot be neglected. Change in metal surface properties can cause contact resistance. In particular, since cars are used in external environments of extreme temperature, humidity, and dust, etc., changes in connector and terminal properties cannot be ignored. Reference connection line connector or terminal contact failure causes high or variable contact resistance resulting in an unstable, shifting midpoint reference voltage. Further, if the reference connection line becomes open circuited, voltage at the midpoint reference node cannot be detected. If battery module voltage cannot be accurately detected in a car power source apparatus, severe battery degradation can result from over-charge or over-discharge, or even though the battery can be charged and discharged, charge and discharge are abnormally limited or halted, and the car cannot be driven normally by the battery.

The impact of this drawback can be reduced, for example, by connecting the battery midpoint reference node to the voltage detection circuit via two connecting cords. However, even with two connecting cords, contact resistance or other degradation of both cords can cause failure to accurately detect voltage. In particular, if detected voltage becomes unreliable due to degradation such as contact resistance, it is impossible to determine if the detected voltage is accurate or not.

The present invention was developed to further resolve this drawback. Thus it is a primary object of the present invention to provide a car power source apparatus which can determine whether or not a malfunction has occurred in detecting battery module voltage, and which can charge and discharge while protecting battery modules.

The car power source apparatus of the present invention is provided with a battery 1 having a plurality of battery modules 2 connected in series on positive and negative sides of a midpoint reference node 8, and a voltage detection circuit 3 that detects the voltage of one or a plurality of battery modules 2 with respect to the midpoint reference node 8 of the battery 1. The battery midpoint reference node 8 of the power source apparatus is connected to the voltage detection circuit 3 via a plurality of reference connection lines 9. Further, one or a plurality of conduction detection circuits 6 connect to the reference connection lines 9, supply a voltage to each reference connection line 9, and detect current. The connection status of each reference connection line 9 to the midpoint reference node 8 is determined via the conduction detection circuit 6.

In the power source apparatus of the present invention, approximately an equal number of battery modules 2 can be connected in series on the positive and negative sides of the midpoint reference node 8. However, in the present patent application, "an approximately equal number of battery modules 2 connected in series on the positive and negative sides of the midpoint reference node 8" means the difference in the number of battery modules 2 connected on the positive and negative sides is 10% or less than the total number of battery modules 2.

The conduction detection circuit 6 can be configured with one or a plurality of voltage supply switches 11 to apply voltage to a reference connection line 9 via a current limiting resistor 12, a current detection device 13 connected in series with the voltage supply switches 11 to determine if conduction occurs, and conduction switches 14 to connect the current detection device 13 with each reference connection line 9. This conduction detection circuit 6 connects the series circuit comprising the current detection device 13, the current limiting resistor 12, and voltage supply switches 11 to one reference connection line 9 selected by a conduction switch 14. Voltage from the voltage supply switches 11 is applied to the selected reference connection line 9, conduction or no conduction is detected by the current detection device 13, and conduction of the selected reference connection line 9 is determined.

The current limiting resistor 12 can be connected to battery modules 2 via a plurality of voltage supply switches 11. The voltage supply switches 11, current detection device 13, and conduction switches 14 can be optically coupled semiconductor switches.

In the power source apparatus of the present invention, determination of the connection status of the reference connection line 9 can be limited to only specified times. Further, a conduction switch 14 connected to a reference connection line 9 determined to have abnormal connection can be held in the off state. Finally, even if all the reference connection lines 9 of the power source apparatus of the present invention are determined to have abnormal connection, at least one conduction switch 14 can be retained in an activated state.

The car power source apparatus of the present invention has the characteristic that it can determine whether or not malfunction has occurred in voltage detection for battery modules of the battery, and it can charge and discharge the battery while protecting battery modules. This is because the car power source apparatus of the present invention connects the battery midpoint reference node to a voltage detection circuit via a plurality of reference connection lines. A conduction detection circuit is connected to each reference connection line to apply voltage to, and detect current in that reference connection line, and the conduction detection circuit determines the status of the connection of each reference connection line to the midpoint reference node. Since this configuration of power source apparatus has a plurality of reference connection lines, even if contact failure occurs on one reference connection line, another line can be used. Further, since the conduction detection circuit of the power source apparatus of the present invention supplies voltage to a reference connection line and detects contact failure and open circuit by the state of current flow in the reference connection line, it can accurately determine whether or not the condition of the reference connection line is abnormal, and thus voltages of the battery modules of the battery can be accurately detected.

Finally, a power source apparatus associated with one aspect of the present invention allows connection status of a plurality of reference connection lines to be determined while selecting an individual line, and it allows simplification of circuitry to determine conduction. This is because one reference connection line selected by a conduction switch is connected to the series circuit comprising the current detection device, current limiting resistor, and voltage supply switches, and detection of the conduction state of the reference connection line is made by one current detection device.

The above and further objects and features of the invention will more fully be apparent from the following detailed description with accompanying drawings.

DETAILED DESCRIPTION OF THE PREFERRED EMBODIMENTS

Figure 1:
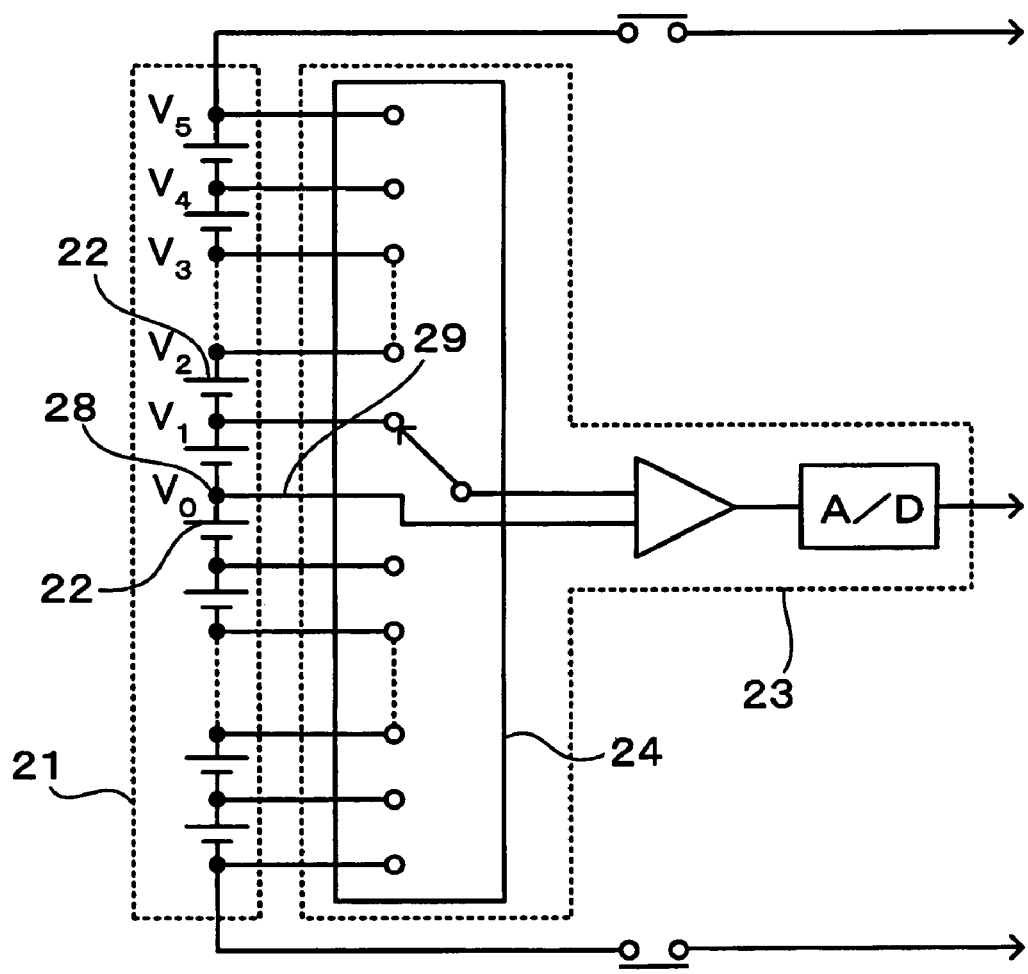
FIG. 1 is a circuit diagram showing the voltage detection circuit of a prior art power source apparatus.
Figure 2:
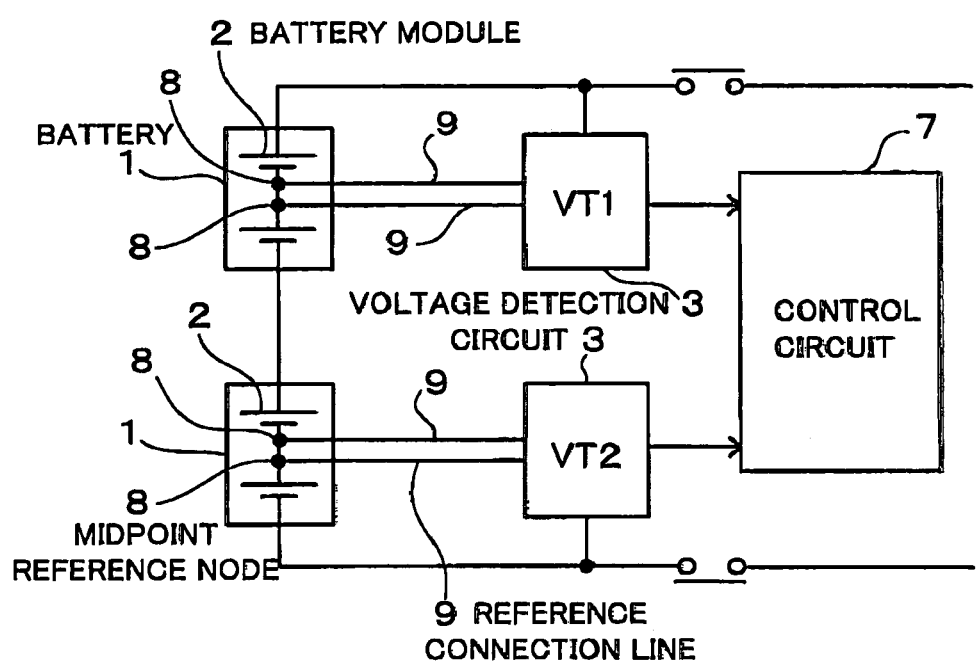
FIG. 2 is an abbreviated structural diagram of an embodiment of the car power source apparatus of the present invention.
Figure 3:
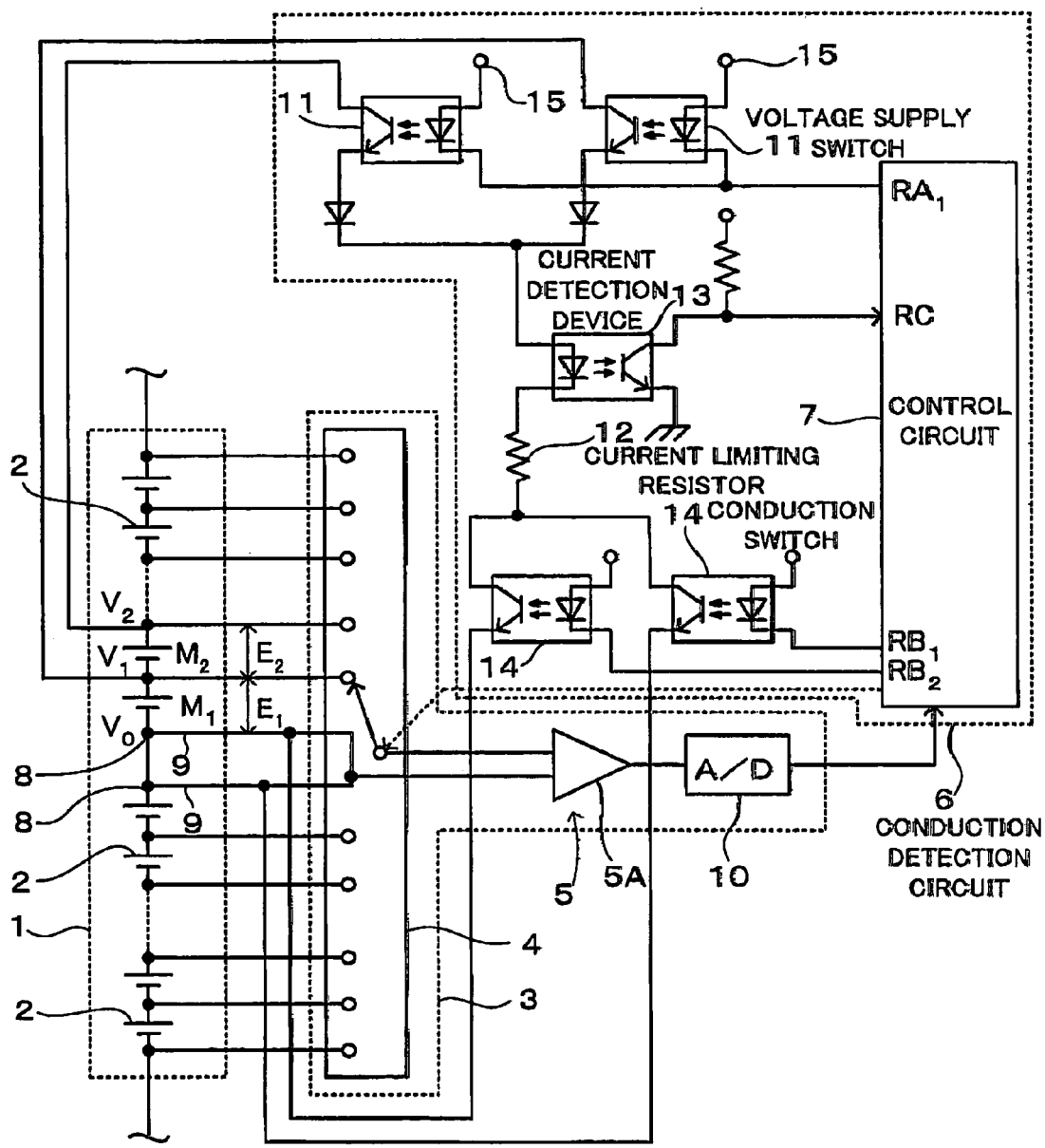
FIG. 3 is a circuit diagram of the voltage detection circuit of the car power source apparatus shown in FIG. 2.

The car power source apparatus shown in FIGS. 2 and 3 is provided with a driving battery 1 comprising a plurality of battery modules 2 connected in series, and a voltage detection circuit 3 to detect voltage of the battery modules 2 which make up the driving battery 1.

The voltage detection circuit 3 has a multiplexer 4 connected at its input side to detect voltage of a plurality of battery modules 2 by time-division switching, and output of the multiplexer 4 is connected to the voltage detection section 5. As shown in FIG. 3, the multiplexer 4 is connected to the input side of the voltage detection circuit 3, it switches battery module 2 connection nodes, and it inputs the voltage of the connected node to the voltage detection section 5.

The voltage detection circuit 3 detects the voltage of all battery modules 2, or it detects the voltage of single units of battery modules 2, where a plurality of battery modules 2 makes up a single unit. For example, in a battery 1 having fifty battery modules 2 connected in series, it is desirable to detect the voltage of all fifty battery modules 2 with the voltage detection circuit 3. The detected voltage of each battery module 2 is used to determine remaining capacity of the battery module 2, or it is used to correct remaining capacity computed by integrating charge and discharge current. In addition, detected voltage can be used to cut-off discharge current in an over-discharge state when remaining capacity becomes zero and complete discharge is detected, and to cut-off charging current in an over-charge state when full charge has been detected.

The driving battery 1, which has many battery modules 2 connected in series, is charged and discharged with the same current. Therefore, the charge capacity and discharge capacity of all battery modules 2 is the same. However, electrical characteristics of all the battery modules 2 do not always change together in equal fashion. In particular, as the number of charge-discharge cycles increase, the degree of degradation of each battery module 2 becomes different and capacity available at full-charge changes. If this becomes the case, battery modules 2 with reduced full-charge capacity become more susceptible to over-charge and over-discharge. Since electrical characteristics of a battery module 2 that is over-charged or over-discharged degrade radically, over-charge or over-discharge of a battery module 2 with reduced full-charge capacity results in abrupt degradation. Therefore, it is important to charge and discharge the driving battery 1 while protecting all battery modules 2. Specifically, the driving battery 1 has many battery modules 2 connected in series, and it is important to charge and discharge the driving battery 1 while preventing over-charge and over-discharge of all the battery modules 2. The voltage detection circuit 3 detects the voltage of each battery module 2 to allow battery charge and discharge while protecting all battery modules 2.

The power source apparatus shown in FIG. 2 has all its battery modules 2 divided into two blocks. Two sets of voltage detection circuits 3 are provided to detect the voltage of battery modules 2, which are divided into two blocks. For example, a driving battery 1 with fifty battery modules 2 connected in series is divided into two equal blocks of twenty five battery modules 2 each, or it is divided into blocks of unequal number such as twenty four and twenty six battery modules 2 for a total of fifty battery modules 2. A battery module 2 has five nickel hydrogen batteries connected in series. Altogether the driving battery 1 has two hundred and fifty nickel hydrogen batteries connected in series for an output voltage of 300V. However, a battery module 2 does not necessarily have five batteries connected in series, and it may have four rechargeable batteries or less, or six rechargeable batteries or more connected in series. In addition, a driving battery 1 does not necessarily have fifty battery modules connected in series, and it may have a fewer number of battery modules or a greater number of battery modules connected in series. Further, other types of rechargeable batteries, such as lithium ion rechargeable batteries or nickel cadmium batteries may also be used as the rechargeable batteries of the battery modules.

In a power source apparatus with fifty battery modules 2 connected in series which detects voltage with two voltage detection circuits 3, one voltage detection circuit 3 detects the voltage of twenty four to twenty six battery modules 2. A multiplexer 4 of the voltage detection circuit 3 switches the battery module 2 for voltage detection and successively outputs the voltage at all battery module 2 connection nodes to the voltage detection section 5. Consequently, the multiplexer 4 is connected at the input side of the voltage detection section 5, and the multiplexer 4 sequentially switches the battery module connection node detected by the voltage detection section 5.

The voltage detection section 5 detects battery module voltage by detecting the voltage at a battery module connection node with respect to a midpoint reference node 8. The midpoint reference node 8 is a point midway between the plurality of series connected battery modules 2 with approximately an equal number of battery modules 2 connected on the positive and negative sides of the midpoint reference node 8. The voltage detection section 5 of the figure is a difference amplifier 5A. The difference amplifier 5A has one input terminal connected to the midpoint reference node 8 and the other input terminal connected through the multiplexer 4 to a battery module connection node to detect connection node voltage with respect to the midpoint reference node 8. However, the voltage detection section does not necessarily have to be a difference amplifier. This is because other amplifier configurations with the midpoint reference node connected to a negative side and a battery module connection node connected through the multiplexer to a positive side can also detect battery module connection node voltage with respect to the midpoint reference node.

Battery module voltage is detected as the voltage difference between connection nodes connected to both terminals of a battery module 2. For example, in FIG. 3, voltage E1 of battery module M1 is detected as V1-V0, and voltage E2 of battery module M2 is detected as V2-V1. Calculation of battery module 2 voltage from the difference between connection node voltages is performed by a control circuit 7. In the voltage detection circuit 3 of the figure, the output side of the multiplexer 4 is connected to the voltage detection section 5, and the output side of the voltage detection section 5 is connected to an analog-to-digital (A/D) converter 10. The voltage detection circuit 3 sequentially switches connection nodes via the multiplexer 4 to detect connection node voltages via the voltage detection section 5, converts voltage detection section 5 output to a digital signal via the A/D converter 10, and inputs that digital signal to the control circuit 7. The control circuit 7 operates on the input digital voltage signal to determine battery module 2 voltage.

The voltage detection circuit 3 detects connection node voltages of the battery 1 with respect to the midpoint reference node 8. Namely, the voltage detection circuit detects connection node voltages with midpoint reference node voltage as a reference. Consequently, if midpoint reference node voltage is disrupted, none of the connection node voltages can be accurately detected, and none of the battery module 2 voltages can be accurately determined as well. The midpoint reference node 8 of the battery 1 is connected to the voltage detection circuit 3 via a reference connection line 9. The reference connection line 9 connects the input side of the voltage detection circuit 3 to the midpoint reference node 8 of the battery 1 via a connection cord. Further, the connection cord connects to the midpoint reference node 8 of the battery 1 via a connector or terminal. The connection cord, which is connected at one end to the midpoint reference node 8, is connected at the other end by solder attach or via a connector to the input side of a printed circuit board, which has surface mounted electronic components to implement the voltage detection circuit 3. Contact resistance can easily occur at the connection cord, connector, or terminal. If contact resistance develops in the reference connection line 9, midpoint reference node voltage, which is input to the voltage detection circuit 3, will shift.

To avoid this drawback, the power source apparatus of FIGS. 2 and 3 has a plurality of reference connection lines 9 to connect the midpoint reference node 8 of the battery 1 to the voltage detection circuit 3. The power source apparatus of the figures connects the midpoint reference node 8 and the voltage detection circuit 3 with two redundant systems of reference connection lines 9. Although not illustrated, the power source apparatus can also connect the midpoint reference node to the voltage detection circuit via three or more systems of reference connection lines. The midpoint reference node may be connected to ground.

In addition, the power source apparatus of FIG. 3 has a conduction detection circuit 6 to detect contact resistance in each of the reference connection lines 9. Contact resistance in a reference connection line 9 can be detected by forcing current through that line. This is because electrical resistance becomes large if contact resistance develops, and current will not flow normally. Further, malfunction is not limited to contact resistance, and the connection cord of a reference connection line 9 can also open circuit. In the case of an open circuit, electrical resistance becomes even greater, and current will not flow. Therefore, contact resistance and connection cord open circuit can be detected by forcing current through the reference connection lines 9. However, since the reference connection lines 9 connect to the midpoint reference node 8 of the battery 1, the lines are at ground potential or zero volts. In that grounded state, current cannot flow through the reference connection lines 9. The conduction detection circuit 6 supplies voltage to the reference connection lines 9 to induce current flow, detects that current flow, and determines the connection status or continuity of the reference connection lines 9.

The conduction detection circuit 6 connects to reference connection lines 9 to force current through sections readily susceptible to contact resistance and open circuits. Reference connection lines 9 are more susceptible to contact resistance and open circuits at the battery end than at the voltage detection circuit end. The conduction detection circuit 6 of FIG. 3 connects to reference connection lines 9 at the input side of the voltage detection circuit 3. This conduction detection circuit 6 can force current into a connection cord from the input side of the voltage detection circuit 3, and can pass current through the connecting region of a connection cord and the midpoint reference node 8. Specifically, current can be forced through the connection cord, connector, and terminal that connect a reference connection line 9 and midpoint reference node 8, where there is a possibility of contact resistance or open circuit. If the line in which current is forced has contact resistance or an open circuit, electrical resistance will be high and little or no current will flow. Consequently, the conduction detection circuit 6 applies voltage to a reference connection line 9, and detects contact resistance and open circuit from current flow conditions.

The conduction detection circuit 6 of FIG. 3 is provided with voltage supply switches 11 to apply voltage to a reference connection line 9 via a current limiting resistor 12, one current detection device 13 connected in series with the voltage supply switches 11 to detect conduction or no conduction, conduction switches 14 to connect the current detection device 13 to each reference connection line 9, and a control circuit 7 to control voltage supply switches 11 and conduction switches 14 on and off, to judge whether the current detection device 13 is on or off, and to determine if the condition of reference connection lines 9 is normal or not.

The voltage supply switches 11, current detection device 13, and conduction switches 14 are optically coupled semiconductor switches. An optically coupled semiconductor switch is an opto-electronic device that optically couples a light emitting diode (LED) and a photo-transistor. A conduction detection circuit 6, with voltage supply switches 11 and conduction switches 14 that are optically coupled semiconductor switches, can have optical coupling without electrical connection. In other words, the LEDs can be switched on and off while disconnected from the ground line. Therefore, ground for the circuit that turns the LEDs on and off can be a common ground allowing simplified circuit structure. However, optically coupled semiconductor switches do not necessarily have to used for the voltage supply switches 11 and conduction switches 14. Relays and semiconductor switches such as transistors can also be used. Semiconductor switches are switched on and off by controlling base current or gate voltage. Relay contacts are switched on and off by passing current through a solenoid coil or cutting-off current to the coil.

The conduction detection circuit 6 of the figure has two sets of voltage supply switches 11 connected in parallel. A conduction detection circuit 6, which supplies voltage to a reference connection line 9 via a plurality of voltage supply switches 11, can supply voltage via one voltage supply switch 11 even if another switch cannot properly supply voltage. Specifically, one voltage supply switch is a back-up for reliably supplying voltage to a reference connection line 9. However, the conduction detection circuit can also supply voltage to a reference connection line via just one voltage supply switch.

The current limiting resistor 12 limits the current flowing through a reference connection line 9. The current limiting resistor 12 is connected in series with optically coupled semiconductor switches, and controls the amount of current through those switches. The electrical resistance of the current limiting resistor 12 is a value that passes current through a reference connection line 9 capable of turning on the optically coupled semiconductor switch of the current detection device 13.

The current detection device 13 detects the flow of a specified amount of current in a reference connection line 9. The current detection device 13 of the figure is an optically coupled semiconductor switch which is an opto-electronic device. The optically coupled semiconductor switch turns on if a specified amount of current flows through a reference connection line 9 and turns on the LED, which turns on the semiconductor switch optically coupled with the LED. However, the current detection device 13 can be any device that can detect a specified amount of current. For example, a device such as a current sensor that detects current larger than a set current can also be used as the current detection device.

Conduction switches 14 connect to each reference connection line 9 to determine if each reference connection line 9 is conducting normally or not. In the conduction detection circuit 6 of the figure, a separate conduction switch 14 is connected to each reference connection line 9, and each reference connection line 9 is connected to the current detection device 13 via each separate conduction switch 14. When a conduction switch 14 turns on, voltage from the voltage supply switches 11 is supplied to a reference connection line 9, and a current controlled by the current limiting resistor 12 flows. In the power source apparatus of the figures, two sets of conduction switches 14 are provided because two systems of reference connection lines 9 are provided. Each conduction switch 14 connects each reference connection line 9 to the current detection device 13. Although not illustrated, each reference connection line of the conduction detection circuit can also connect to the current detection device and voltage supply switches via a selection switch.

The control circuit 7 switches the voltage supply switches 11 and conduction switches 14 on and off, and judges whether or not a reference connection line 9 can conduct normally. Specifically, a reference connection line 9 selected by a conduction switch 14 is connected to the series circuit comprising the current detection device 13, current limiting resistor 12, and voltage supply switches 11. Voltage is applied to a reference connection line 9 from the voltage supply switches 11, conduction or no conduction is detected by the current detection device 13, and conduction or no conduction is determined by the control circuit 7 for the selected reference connection line 9. Next, the control circuit 7 takes the following action based on results of reference connection line 9 conduction determination. Two reference connection lines 9 are used in the present embodiment. If both reference connection lines 9 can conduct normally, both lines are used, and subsequent battery voltage detection is performed. When one reference connection line 9 cannot conduct, the other line, which can conduct, is used, and subsequent battery voltage detection is performed. When both reference connection lines 9 cannot conduct, midpoint reference node 8 voltage cannot be detected. Therefore, the control circuit 7 discerns that voltage detection is not possible and issues an error signal to the car warning of the abnormal condition. Subsequently, action may be taken to suspend battery use due to the abnormal condition, or an adjacent battery module connection node voltage may be used as the midpoint reference node voltage, or an approximate voltage calculated from terminal voltages at both ends of the battery 1 may be used as the midpoint reference node voltage. Battery voltage can then be measured and the battery 1 can continue to be used. In the case of three or more reference connection lines, midpoint reference node voltage can be detected as long as at least one line conducts normally.

Figure 4:
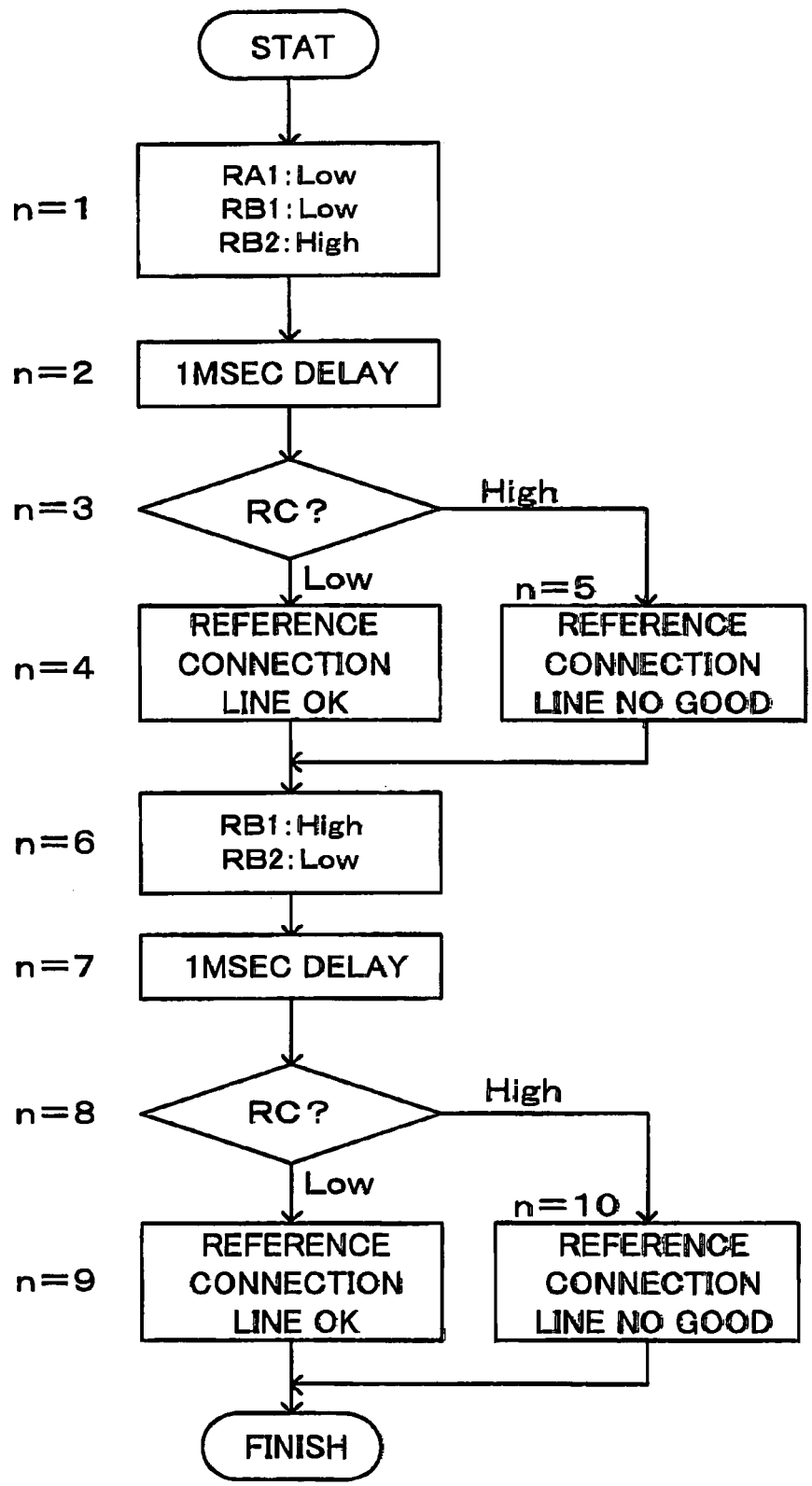
FIG. 4 is a flow-chart for determining connection status of each reference connection line in an embodiment of the car power source apparatus of the present invention.

As shown in the flow-chart of FIG. 4 and described below, the control circuit 7 forces current through each reference connection line 9 to determine whether the reference connection line 9 conducts normally or not.

[step n=1]

The control circuit 7 applies a LOW signal to terminal RA1, which is connected to the LEDs of the voltage supply switches 11. In this state, the LEDs of the voltage supply switches 11 conduct and light up. Opposite terminals of the LEDs are connected to supply voltage. In addition, terminal RB1, which is connected to the LED of one of the conduction switches 14, has a LOW signal applied, which lights up that LED and switches that conduction switch 14 on. Terminal RB2, which is connected to the LED of the other conduction switch 14, has a HIGH signal applied, which turns that LED and conduction switch 14 off. In this state, current flows through one of the reference connection lines 9 via the current limiting resistor 12.

[steps n=2, 3]

After current has flowed for a specified period (1 msec), the control circuit 7 determines if voltage at terminal RC is HIGH or LOW.

[steps n=4, 5]

If current flows normally through the reference connection line 9, the LED of the current detection device 13 lights up. Consequently, the semiconductor switch of the current detection device 13, which is an optically coupled semiconductor switch, turns on and input at terminal RC becomes LOW. Therefore, if the signal at terminal RC is LOW, that reference connection line 9 is judged to be properly connected to the midpoint reference node 8 of the battery 1. If the reference connection line 9 is not properly connected to the midpoint reference node 8 of the battery 1 due to contact resistance or open circuit, etc., the LED of the current detection device 13, which is an optically coupled semiconductor switch, does not light up, and output of the optically coupled semiconductor switch is HIGH. Therefore, if the input signal at terminal RC is HIGH, that reference connection line 9 is judged to be abnormal.

[step n=6]

Next, the control circuit 7 applies a HIGH signal to terminal RB1 to turn that LED off and switch that conduction switch 14 from on to off. In addition, terminal RB2 is brought LOW to light up that LED and switch that conduction switch 14 from off to on. In this step, the conduction switch 14 which is controlled on, is swapped. As a result, the voltage supply switches 11 supply voltage to a different reference connection line 9.

[steps n=7, 8]

After current has flowed for a specified period (1 msec), the control circuit 7 determines if voltage at terminal RC is HIGH or LOW.

[steps n=9, 10]

Since the LED of the current detection device 13 lights up if current flows normally through the reference connection line 9, the semiconductor switch of the current detection device 13, which is an optically coupled semiconductor switch, turns on and input at terminal RC becomes LOW. Therefore, if the signal at terminal RC is LOW, that reference connection line 9 is judged to be properly connected to the midpoint reference node 8 of the battery 1. If the reference connection line 9 is not properly connected to the midpoint reference node 8 of the battery 1 due to contact resistance or open circuit, etc., the LED of the current detection device 13, which is an optically coupled semiconductor switch, does not light up, and output of the optically coupled semiconductor switch is HIGH. Therefore, if the input signal at terminal RC is HIGH, that reference connection line 9 is judged to be abnormal.

A conduction switch connected to a reference connection line determined to have abnormal connection by these steps, can subsequently be held in the off state. A voltage detection circuit can operate properly if at least one reference connection line is properly connected. Therefore, subsequent reference connection line status detection only needs to check the remaining reference connection line, determined to be properly connected, without continuing to check connection of the reference connection line judged to have failed. Thus, by holding the conduction switch of a reference connection line, determined to be abnormal, in the off state, it is possible to reduce power consumption by an amount equivalent to the conduction switch driving current.

In the case of abnormal connection detected for all reference connection lines, it is desirable to have at least one operable conduction switch. This is because, even if the detection circuit is not always properly connected to the battery, it allows reliable circuit function for operations such as detection circuit test.

Finally, it is desirable to limit detection of reference connection line 9 connection status to only specified times. This is because battery charge is used for this detection. Specifically, battery load increases with the frequency of detection, and this translates to increased consumption of remaining capacity of the corresponding battery. Consequently, it is preferable to limit connection status detection to short intervals at specified times. The specified times are at specific timing conditions such as at system start-up or at given time intervals. For example, the steps above can be performed once at system start-up, or once every ten seconds.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims. This application is based on applications No. 2004-187843 filed in Japan on Jun. 25, 2004, the content of which is incorporated hereinto by reference.

What is claimed is:

1. A car power source apparatus comprising:
   a battery having a plurality of battery modules connected in series on positive and negative sides of a midpoint reference node;
   a voltage detection circuit that detects the voltage of one or a plurality of battery modules with respect to the midpoint reference node of the battery, the voltage detection circuit being connected on positive and negative sides of the midpoint reference node, the battery midpoint reference node being connected to the voltage detection circuit via a plurality of reference connection lines; and
   at least one conduction detection circuit for detecting abnormal conduction including a contact failure and an open circuit in each of the reference connection lines, supplying voltage from the battery modules to each of the reference connection lines to forcibly pass a current, and detecting current in each of the reference connection lines, the conduction detection circuit being connected to the reference connection lines separately with respect to the voltage detection circuit,
   wherein the connection status of each of the reference connection lines to the midpoint reference node can be detected via the conduction detection circuit.

2. A car power source apparatus as recited in claim 1 wherein an approximately equal number of battery modules are connected in series on positive and negative sides of the midpoint reference node.

3. A car power source apparatus comprising:
   a battery having a plurality of battery modules connected in series on positive and negative sides of a midpoint reference node; and
   a voltage detection circuit for detecting the voltage of one or a plurality of battery modules with respect to the midpoint reference node of the battery, the voltage detection circuit being connected on positive and negative sides of the midpoint reference node, the battery midpoint reference node being connected to the voltage detection circuit via a plurality of reference connection lines, at least one conduction detection circuit for detecting abnormal conduction including a contact failure and an open circuit in each of the reference connection lines, supplying voltage from the battery modules to each of the reference connection lines to forcibly pass a current, and detecting current in each of the reference connection lines;

the conduction detection circuit being connected to the reference connection lines separately with respect to the voltage detection circuit, and the conduction detection circuit being operable to detect the connection status of each of the reference connection lines to the midpoint reference node, wherein the conduction detection circuit is provided with a plurality of voltage supply switches for applying voltage from the battery modules to the reference connection lines via a current limiting resistor, one current detection device connected in series with the voltage supply switch for determining if conduction occurs or not, and a plurality of conduction switches for connecting the current detection device with each of the reference connection lines; and wherein the series circuit comprising the current detection device, the current limiting resistor, and the voltage supply switch is connected to one of the reference connection lines selected by the associated conduction switch; voltage supplied from the battery modules via the voltage supply switch is applied to the selected reference connection line; and conduction or no conduction is detected by the current detection device to detect conduction of the selected reference connection line, and wherein the current limiting resistor is connected to the battery modules via a plurality of voltage supply switches.

4. A car power source apparatus as recited in claim 1 wherein detection of reference connection line connection status is limited to specified times only.

5. A car power source apparatus as recited in claim 3 wherein a conduction switch connected to a reference connection line detected to have abnormal connection, is maintained in the off state.

6. A car power source apparatus as recited in claim 3 wherein at least one conduction switch is kept operable, even when the connection status of all reference connection lines is detected as abnormal.

7. A car power source apparatus comprising:

a battery having a plurality of battery modules connected in series on positive and negative sides of a midpoint reference node;

a voltage detection circuit that detects the voltage of one or a plurality of battery modules with respect to the midpoint reference node of the battery, the voltage detection circuit being connected on positive and negative sides of the midpoint reference node, the battery midpoint reference node being connected to the voltage detection circuit via a plurality of reference connection lines; and at least one conduction detection circuit for detecting abnormal conduction including a contact failure and an open circuit in each of the reference connection lines, the conduction detection circuit being connected to the reference connection lines separately with respect to the voltage detection circuit for supplying voltage from the battery modules to each of the reference connection lines to forcibly pass a current, and detecting current in each of the reference connection lines, wherein the connection status of each of the reference connection lines to the midpoint reference node can be detected via this conduction detection circuit, wherein the conduction detection circuit is provided with at least one voltage supply switch for applying voltage from the battery modules to the reference connection lines via a current limiting resistor, one current detection device connected in series with the voltage supply switch for determining if conduction occurs or not, and a plurality of conduction switches for connecting the current detection device with each of the reference connection lines, wherein the series circuit comprising the current detection device, the current limiting resistor, and the voltage supply switch is connected to one of the reference connection lines selected by the associated conduction switch so that voltage supplied from the battery modules via the voltage supply switch is applied to the selected reference connection line; and conduction or no conduction is detected by the current detection device to detect conduction of the selected reference connection line, and wherein the conduction detection circuit further comprises a control circuit for controlling the voltage supply switch and the conduction switches on and off, judging whether the current detection device is on or off, and determining if the status of the reference connection lines is normal or not, and wherein the current limiting resistor is connected to the battery modules via a plurality of voltage supply switches.

8. A car power source apparatus as recited in claim 7 wherein based on results of control circuit judgment of reference connection line conduction;

when all of the plurality of reference connection lines can conduct normally, all reference connection lines are used to perform subsequent battery voltage detection;

when any reference connection line cannot conduct, other reference connection lines that can conduct are used to perform subsequent battery voltage detection; and when none of the reference connection lines can conduct, the control circuit recognizes voltage detection is impossible.

9. A car power source apparatus as recited in claim 7 wherein the control circuit is configured to perform calculations to detect battery module voltage from the voltage difference at connection nodes connected to both ends of a battery module.

10. A car power source apparatus as recited in claim 1 wherein all the battery modules taken as a whole are divided into a plurality of blocks.

11. A car power source apparatus as recited in claim 1 wherein the battery modules are either nickel hydrogen batteries, lithium ion rechargeable batteries, or nickel cadmium batteries.

* * * * *